(12) United States Patent
Wei et al.

(10) Patent No.: US 9,705,484 B2
(45) Date of Patent: Jul. 11, 2017

(54) DELAY CELL IN A STANDARD CELL LIBRARY

(71) Applicant: MediaTek Inc., Hsin-Chu (TW)

(72) Inventors: Ying-Chun Wei, Hsinchu (TW); Jen-Hang Yang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/138,654

(22) Filed: Apr. 26, 2016

(65) Prior Publication Data
US 2016/0380624 A1 Dec. 29, 2016

Related U.S. Application Data

(60) Provisional application No. 62/184,493, filed on Jun. 25, 2015.

(51) Int. Cl.
*H03K 5/134* (2014.01)
*G06F 17/50* (2006.01)
*H03K 5/00* (2006.01)

(52) U.S. Cl.
CPC ........... *H03K 5/134* (2014.07); *G06F 17/505* (2013.01); *H03K 2005/00195* (2013.01)

(58) Field of Classification Search
CPC .......... H03K 5/13; H03K 5/133; H03K 5/134; H03K 5/14; H03K 2005/00013; H03K 2005/0015; H03K 2005/00195; H03K 2005/00221
USPC ....... 327/261, 277, 278, 281, 283, 284, 285, 327/288, 290
See application file for complete search history.

(56) References Cited

U.S. PATENT DOCUMENTS

| | | | | |
|---|---|---|---|---|
| 5,416,436 A * | 5/1995 | Rainard | ................. | H03K 5/131 327/270 |
| 5,598,111 A * | 1/1997 | Enomoto | ............... | H03K 5/133 326/33 |
| 6,339,553 B1 * | 1/2002 | Kuge | ................... | G11C 7/1066 327/291 |
| 2001/0054926 A1 * | 12/2001 | Minami | ................. | H03K 5/133 327/277 |
| 2003/0189452 A1 * | 10/2003 | Honda | ................... | H03K 5/133 327/276 |
| 2004/0036545 A1 * | 2/2004 | Chung | ..................... | H03B 5/04 331/135 |
| 2004/0141382 A1 * | 7/2004 | Ito | ......................... | G11C 7/065 365/194 |

(Continued)

*Primary Examiner* — William Hernandez
(74) *Attorney, Agent, or Firm* — McClure, Qualey & Rodack, LLP

(57) ABSTRACT

A delay cell for generating a desired delay exceeding a minimum delay defined in a standard cell library is provided, which includes a delay element and an output inverter. The delay element receives an input signal to generate an internal signal with a propagation delay relative to the input signal, which includes a P-type transistor, a first resistor, a second resistor, and an N-type transistor. The P-type transistor applies a supply voltage to the first resistor by the input signal. The first resistor is coupled between the P-type transistor and the output inverter. The second resistor is coupled to the output inverter and coupled to the ground through the N-type transistor by the input signal. The output inverter receives the internal signal to generate an output signal with the desired delay, which is dominated by the propagation delay, relative to the input signal.

13 Claims, 8 Drawing Sheets

(56) References Cited

U.S. PATENT DOCUMENTS

2005/0093610 A1\* 5/2005 Park .................. H03K 5/06
327/377

\* cited by examiner

DELAY CELL IN A STANDARD CELL LIBRARY

CROSS REFERENCE TO RELATED APPLICATIONS

This application claims the benefit of U.S. Provisional Application No. 62/184,493, filed on Jun. 25, 2015, the entirety of which is incorporated by reference herein.

BACKGROUND OF THE INVENTION

Field of the Invention

The disclosure relates generally to a delay cell in a standard cell library, and more particularly it relates to a delay cell in a standard cell library with low-power and low-variation.

Description of the Related Art

A large integrated circuit, such as an Application Specific Integrated Circuit (ASIC), generally includes a number of logic elements and sub-elements in a hierarchical arrangement. The circuitry is driven by clock pulses that are applied through an input clock and distributed via interconnect wiring to the various elements of the circuit.

In order for the circuit to function properly, the clock pulses must arrive at each clocked circuit element at the same time. However, the lengths of the wiring that conduct the clock pulses to the different blocks will generally be different. Since the length of time required for an electrical signal to propagate through a wire is proportional to the length of the wire, the clock pulses will arrive at the blocks at different times.

In addition, clock signal paths often include multiple levels of logic elements and buffering. Skew results if there are unequal numbers of elements in the signal paths or if there are variations in how long it takes a signal to pass through various elements. How long it takes a signal to pass through an element depends upon several factors, including the propagation delay characteristics of the particular element, the number of loads the element is driving, and the temperature of the element. Any variation of these factors between two signal paths will skew the clock signals. Even if these factors are identical, there may be variations between individual elements of the same type.

There are several reasons for attempting to eliminate skew. First, it limits the speed at which a system can run. Within a computer, tasks are often performed serially, with data being passed from one stage of the computer to another on subsequent clock cycles. The time period of the clock must be long enough to account for the time it takes a stage to process the data and propagate it to the next stage. Similarly, clock skew may prevent a system from being slowed down. It is often desirable to slow down a system clock for diagnostic purposes, but if slowed down too much, the system may no longer function.

It is clear that there exists a long and unfilled need for a technique capable of reducing clock skew while eliminating the shortcomings discussed above. The present invention solves these problems and provides circuit designers with a simple and inexpensive circuit for reducing integrated circuit clock skew.

BRIEF SUMMARY OF THE INVENTION

For solving above problems, the invention provides a low-power and low-variation delay cell in a standard cell library for clock de-skew application.

In an embodiment, a delay cell for generating a desired delay defined in a standard cell library includes a first delay element and an output inverter. The first delay element receives an input signal at an input node to generate a first internal signal with a first propagation delay relative to the input signal at a first internal node. The first delay element includes a first P-type transistor, a first resistor, a second resistor, and a first N-type transistor. The first P-type transistor is supplied by a supply voltage and controlled by the input signal. The first resistor is coupled between the first P-type transistor and the first internal node. The second resistor is coupled to the first internal node. The first N-type transistor is coupled between the second resistor and a ground and controlled by the input signal. The output inverter receives the first internal signal to generate an output signal with the desired delay relative to the input signal. The output inverter is configured to provide a driving capability defined in the standard cell library for a following stage, in which the desired delay is dominated by the first propagation delay.

According to an embodiment of the invention, the first resistor has a first resistance, and the second resistor has a second resistance, wherein the first propagation delay is dominated according to the first resistance, the second resistance, and a capacitance at the first internal node.

According to an embodiment of the invention, the first P-type transistor has a first P-type turn-on resistance, and the first N-type transistor has a first N-type turn-on resistance, wherein the first resistance exceeds 10 times the first P-type turn-on resistance, and the second resistance exceeds 10 times the first N-type turn-on resistance.

According to an embodiment of the invention, the first P-type transistor and the first N-type transistor are sized to provide a consistent input capacitance defined in the standard cell library for a preceding stage which generates the input signal.

According to another embodiment of the invention, the first delay element further includes a second P-type transistor and a second N-type transistor. The second P-type transistor, which is controlled by a logic signal, is coupled to the first P-type transistor in series or in parallel. The second N-type transistor, which is controlled by the logic signal, is coupled to the first N-type transistor in series or in parallel. The first P-type transistor, the second P-type transistor, the first N-type transistor, and the second N-type transistor construct a logic gate to perform a logic function, such that the first delay element performs the logic function on the logic signal and the input signal to generate the first internal signal with the first propagation delay relative to the logic signal and the input signal.

According to an embodiment of the invention, the second P-type transistor and the second N-type transistor are sized to provide a consistent input capacitance defined in the standard cell library for a preceding stage which generates the logic signal.

According to an embodiment of the invention, the delay cell further includes an input inverter. The input inverter is coupled between the input node and the first delay element and receives the input signal to provide a second internal signal for the first delay element. The input inverter is configured to provide a consistent input capacitance defined in the standard cell library for a preceding stage which generates the input signal.

According to an embodiment of the invention, the delay cell further includes a second delay element. The second delay element is coupled between the input node and the first delay element and receiving the input signal to provide a second internal signal with a second propagation delay relative to the input signal at a second internal node for the first delay element. The second delay element includes a third P-type transistor, a third resistor, a fourth resistor, and a third N-type transistor. The third P-type transistor is supplied by the supply voltage and controlled by the input signal. The third resistor is coupled between the second P-type transistor and the second internal node. The fourth resistor is coupled to the second internal node. The third N-type transistor is coupled between the fourth resistor and the ground. The desired delay is dominated by a sum of the first propagation delay and the second propagation delay.

According to an embodiment of the invention, the third resistor has a third resistance and the fourth resistor has a fourth resistance, wherein the second propagation delay is dominated according to the third resistance, the fourth resistance, and a capacitance at the second internal node.

According to an embodiment of the invention, the third P-type transistor has a third P-type turn-on resistance and the third N-type transistor has a third N-type turn-on resistance, wherein the third resistance exceeds 10 times the third P-type turn-on resistance, and the fourth resistance exceeds 10 times the third N-type turn-on resistance.

According to an embodiment of the invention, the third P-type transistor and the third N-type transistor are sized to provide a consistent input capacitance defined in the standard cell library for a preceding stage which generates the input signal.

According to another embodiment of the invention, the second delay element further includes a fourth P-type transistor and a fourth N-type transistor. The fourth P-type transistor, which is controlled by a logic signal, is coupled to the third P-type transistor in series or in parallel. The fourth N-type transistor, which is controlled by the logic signal, is coupled to the third N-type transistor in series or in parallel. The third P-type transistor, the fourth P-type transistor, the third N-type transistor, and the fourth N-type transistor construct a logic gate to perform a logic function, such that the second delay element performs the logic function on the logic signal and the input signal to generate the second internal signal.

According to an embodiment of the invention, the delay cell further includes an input inverter. The input inverter, which is coupled between the input node and the second delay element, receives the input signal to provide a third internal signal for the second delay element. The input inverter is configured to provide a consistent input capacitance defined in the standard cell library for a preceding stage.

According to an embodiment of the invention, the delay cell further includes an intermediate inverter. The intermediate inverter, which is coupled between the second delay element and the first delay element, receives the second internal signal to provide an intermediate signal for the first delay element. The intermediate signal is reshaped, such that the delay cell is able to operate at a high frequency.

According to an embodiment of the invention, the output signal is delayed by the desired delay behind the input signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
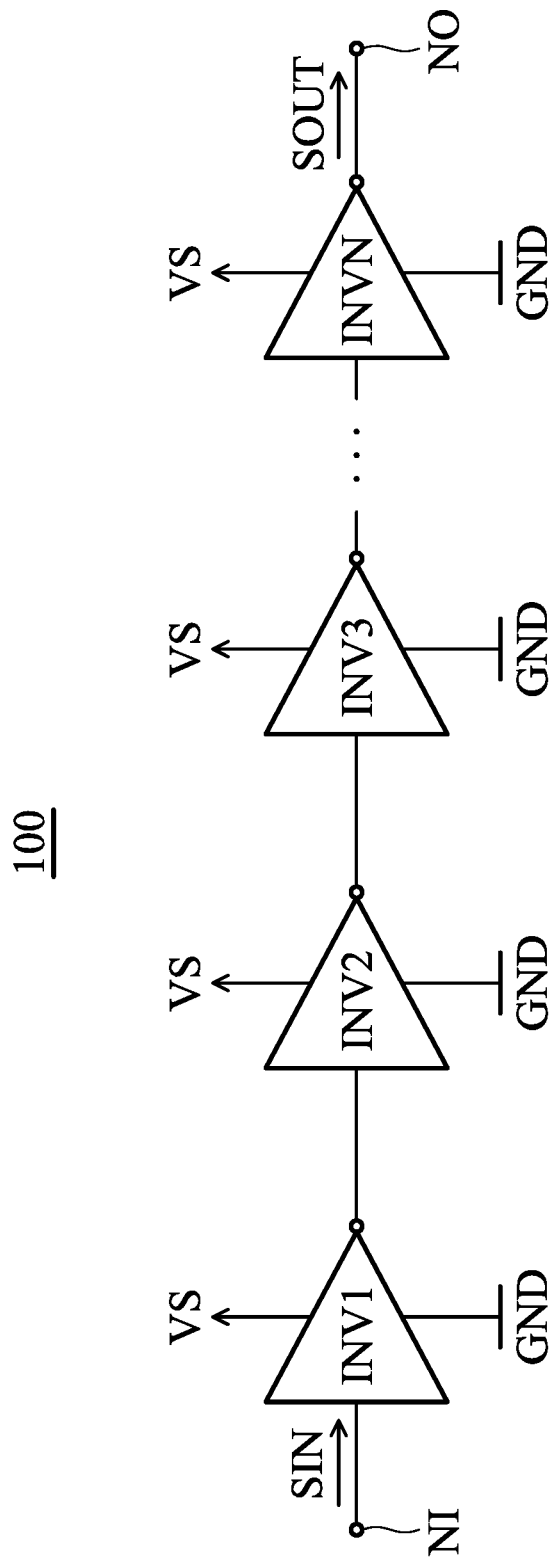
FIG. 1 is a block diagram of a delay cell in accordance with an embodiment of the invention.

FIG. 1 is a block diagram of a delay cell in accordance with an embodiment of the invention. As shown in FIG. 1, the delay cell 100 receives the input signal SIN at the input node NI to generate the output signal SOUT with a delay relative to the input signal SIN at the output node NO. The delay cell 100 includes a plurality of cascaded inverters INV1, INV2, INV3 . . . and INVN, in which the number of N and the size of the inverters INV1, INV2, INV3 . . . and INVN can be carefully chosen by the circuit designers for generating the desired delay.

According to an embodiment of the invention, the delay cell 100 is a standard cell in a standard cell library. The inverter INV1 is configured to provide a fixed driver defined in the standard cell library for a preceding stage which generates the input signal SIN, and the inverter INVN is configured to provide a driving capability defined in the standard cell library for a following stage which receives the output signal SOUT, such that the inverters except for inverters INV1 and INVN of the delay cell 100 are sized for the desired delay.

According to an embodiment of the invention, the delay cell 100 may conduct a large static current from the supply voltage VS to the ground GND when the input signals of the inverters INV1, INV2, INV3 . . . and INVN swing from the high voltage level to the low voltage level, or from the low voltage level to the high voltage level.

The inverter INV1 is illustrated herein. When the input signal SIN is in the middle of the high voltage level and the low voltage level, the P-type transistor and the N-type transistor of the inverter INV1 should be simultaneously turned ON to conduct a current flowing from the supply voltage VS to the ground GND.

At the same time, other P-type transistor and N-type transistor of the inverters INV1, INV2, INV3 . . . and INVN may also be simultaneously turned ON to conduct a larger current flowing from the supply voltage VS to the ground GND, which results a considerable amount of power dissipation, thereby significantly increasing the total power dissipation of the whole chip.

In addition, the leakage power of the delay cell 100 is highly dependent upon the process parameters of the P-type transistors and N-type transistors in the delay cell 100.

Especially for transistors in deep sub-micron, the leakage power is more considerable. Once the process parameters of the P-type transistors and N-type transistors are drifted due to the process variation, the leakage power may be significantly enlarged.

On the other hand, the delay generated by the delay cell 100 is highly dependent upon the process parameters of the inverters INV. According to an embodiment of the invention, the size ratio of the P-type transistor to the N-type transistor of each of the inverters INV1, INV2, INV3 . . . and INVN is carefully chosen for generating the desired delay. Once the process parameters of the P-type transistor and the N-type transistor are shifted due to the process variation, the delay generated by the delay cell 100 is thus significantly varied.

Figure 2:
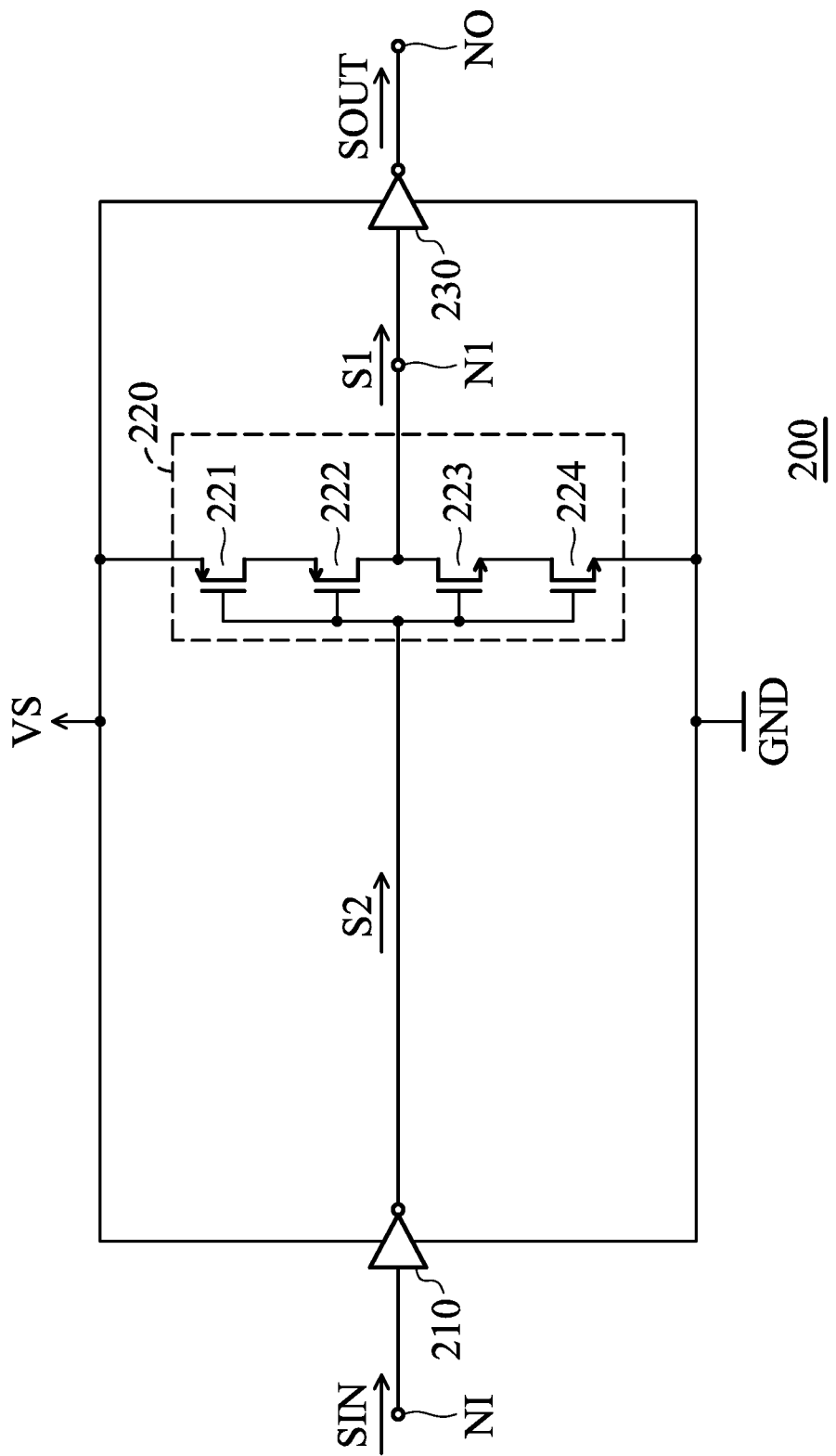
FIG. 2 is a block diagram of a delay cell in accordance with another embodiment of the invention.

FIG. 2 is a block diagram of a delay cell in accordance with another embodiment of the invention. As shown in FIG. 2, the delay cell 200 is coupled between the input node NI and the output node NO and receives the input signal SIN to generate the output signal SOUT with the desired delay relative to the input signal SIN, which includes the input inverter 210, the delay element 220, and the output inverter 230. According to an embodiment of the invention, the delay cell 200 is one of the standard cells in a standard cell library.

The input inverter 210, which is supplied by the supply voltage VS and the ground GND, receives the input signal SIN to generate the second internal signal S2 to the delay element 220. According to an embodiment of the invention, the input inverter 210 is configured to provide a consistent input capacitance defined in the standard cell library for a preceding stage which generates the input signal SIN when the delay cell 200 is one of the standard cells in the standard cell library.

The output inverter 230 receives the first internal signal S1 to generate the output signal SOUT at the output node NO. According to an embodiment of the invention, since the delay cell 200 is one of the standard cells in a standard cell library, the output inverter 230 is configured to provide a driving capability defined in the standard cell library for a following stage which receives the output signal SOUT.

The delay element 220, which is supplied by the supply voltage VS and the ground GND, receives the second internal signal S2 to generate the first internal signal S1. As shown in FIG. 2, the delay element 220 includes the first P-type transistor 221, the second P-type transistor 222, the first N-type transistor 223, and the second N-type transistor 224.

When the second internal signal S2 is in the low voltage level, the first P-type transistor 221 and the second P-type transistor 222 are turned ON while the first N-type transistor 223 and the second N-type transistor 224 are turned OFF, for charging the capacitance at the first internal node N1. Since the first P-type transistor 221 and the second P-type transistor 222 are stacked, the turn-on resistance along the charging path from the supply voltage VS to the first internal node N1 should be increased, compared to a standard inverter. According to an embodiment of the invention, the size of either one of the first P-type transistor 221 and the second P-type transistor 222 and the number of stacked P-type transistors may be adjusted for increasing the turn-on resistance along the charging path.

On the other hand, the turn-on resistance along the discharging path from the first internal node N1 to the ground GND should be increased, since the first N-type transistor 223 and the second N-type transistor 224 are stacked. According to an embodiment of the invention, the size of either one of the first N-type transistor 223 and the second N-type transistor 224 and the number of stacked N-type transistors may be adjusted for increasing the turn-on resistance along the discharging path.

In other words, the propagation delay generated by the delay element 220 is determined by the turn-on resistance along the charging path from the supply voltage VS to the first internal node N1 and the discharging path from the first internal node N1 to the ground GND and the total capacitance at the first internal node N1. The whole delay generated by the delay cell 200 is the sum of the propagation delay of the first inverter 210, the propagation delay of the delay element 220, and the propagation delay of the output inverter 230, in which the whole delay is dominated by the propagation delay of the delay element 220.

Since the turn-on resistance along the charging path and the discharging path of the delay element 220 is increased, the power dissipation of the delay cell 200 should be reduced, compared to the delay cell 100. In addition, the resistance of the power path from the supply voltage VS to the ground GND through the delay element 220 is higher than that of either one of the inverters INV1, INV2, INV3 . . . and INVN, such that the leakage power of the delay cell 200 should be greatly reduced, compared to the delay cell 100.

However, since the delay element 220 is made by P-type and N-type transistors which are sensitive to the process variation, the supply voltage, and the temperature, the propagation delay of the delay element 220 is still sensitive to the process variation. It is better to provide a delay cell with immunity to the process variation, the supply voltage, and the temperature for a standard cell library.

Figure 3:
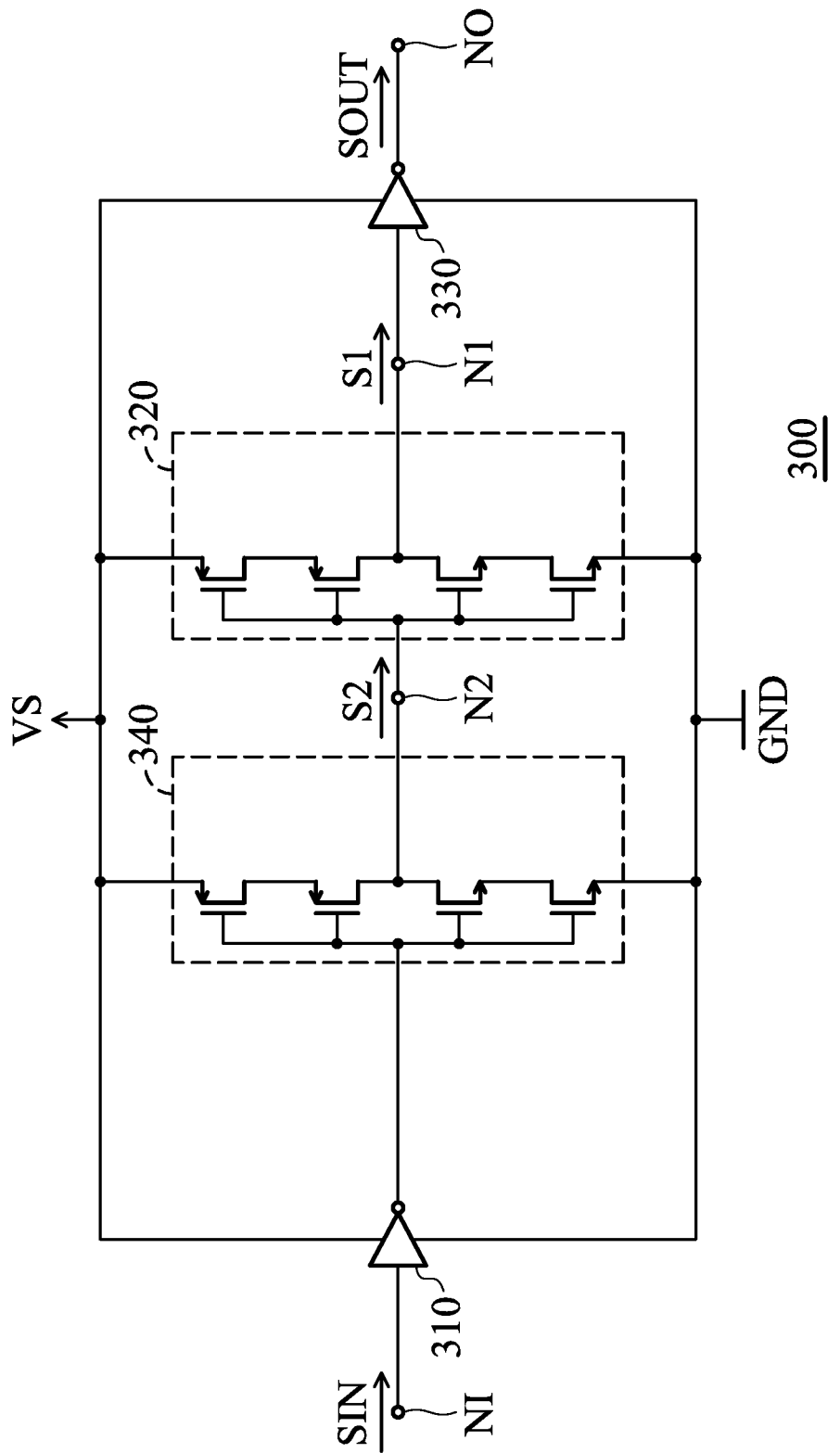
FIG. 3 is a block diagram of a delay cell in accordance with another embodiment of FIG. 2 in the invention.

FIG. 3 is a block diagram of a delay cell in accordance with another embodiment of FIG. 2 in the invention. As shown in FIG. 3, the delay cell 300 includes the input inverter 310, the first delay element 320, the output inverter 330, and the second delay element 340. Compared to FIG. 2, the delay cell 300 further includes the second delay element 340 inserted between the input inverter 310 and the first delay element 320, such that the whole delay generated by the delay cell 300 is dominated by a sum of the propagation delay of the first delay element 320 and the propagation delay of the second delay element 340.

Since the turn-on resistance along the charging path and the discharging path of the first delay element 320 is increased, the power dissipation should be lower than that of the delay cell 100. In addition, the resistance on the path from the supply voltage VS to the ground GND in the first delay element 320 is higher than that of each of the inverters INV1, INV2, INV3 . . . and INVN, such that the leakage power should be greatly reduced by the first delay element 320.

Figure 4:
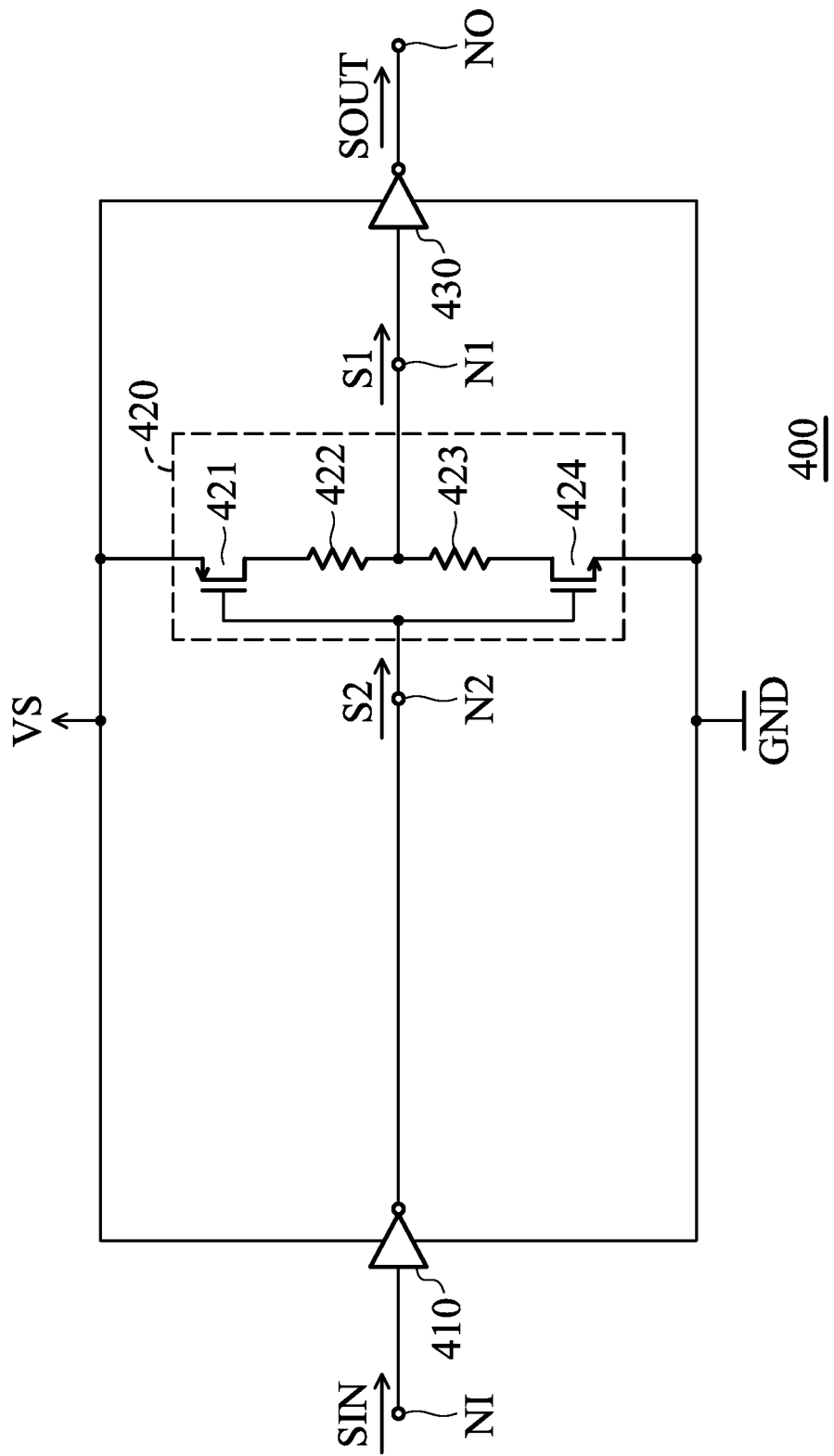
FIG. 4 is a block diagram of a delay cell in accordance with yet another embodiment of the invention.

FIG. 4 is a block diagram of a delay cell in accordance with yet another embodiment of the invention. As shown in FIG. 4, the delay cell 400 is coupled between the input node NI and the output node NO and receives the input signal SIN to generate the output signal SO with a delay relative to the input signal SIN, which includes the input inverter 410, the delay element 420, and the output inverter 430. According to an embodiment of the invention, the delay cell 300 is one of the standard cells in a standard cell library.

The input inverter 410, which is supplied by the supply voltage VS and the ground GND, receives the input signal SIN to generate the second internal signal S2 to the delay element 420. According to an embodiment of the invention, the input inverter 410 is configured to provide a consistent input capacitance defined in the standard cell library for a preceding stage which generates the input signal SIN.

The output inverter 430 receives the first internal signal S1 to generate the output signal SOUT at the output node NO. According to an embodiment of the invention, since the delay cell 400 is one of the standard cells in a standard cell library, the output inverter 430 is configured to provide a driving capability defined in the standard cell library for a following stage which receives the output signal SOUT.

The delay element 420 is supplied by the supply voltage VS and the ground GND and receives the second internal signal S2 to generate the first internal signal S1. As shown in FIG. 4, the delay element 420 includes the first P-type transistor 421, the first resistor 422, the second resistor 423, and the first N-type transistor 424. Compared to FIG. 2, the second P-type transistor 222 is replaced by the first resistor 422, and the first N-type transistor 223 is replaced by the second resistor 423.

Since the first resistor 422 and the second resistor 423 is less sensitive to the process variation, the propagation delay generated by the delay element 420 should be less sensitive, compared to the delay cell 200 in FIG. 2 and the delay cell 100 in FIG. 1. In addition, the first resistor 422 and the second resistor 423 also provides great immunity to the noise of the supply voltage VS and the ground GND.

According to an embodiment of the invention, the delay generated by the delay cell 400 is dominated by the propagation delay of the delay element 420, and the propagation delay of the delay element 420 is dominated by the resistance of the first resistor 422 and the second resistor 423 and the total capacitance at the first internal node N1.

According to an embodiment of the invention, the resistance of the first resistor 422 exceeds the turn-on resistance of the first P-type transistor 421, and the resistance of the second resistance 423 exceeds the turn-on resistance of the first N-type transistor 424. According to another embodiment of the invention, the resistance of the first resistor 422 exceeds 10 times the turn-on resistance of the first P-type transistor 421, and the resistance of the second resistor 423 exceeds 10 times the turn-on resistance of the first N-type transistor 424.

According to an embodiment of the invention, the first P-type transistor 421 and the first N-type transistor 424 are sized to provide a consistent capacitance defined in the standard cell library for a preceding stage which generates the input signal SIN, such that the input inverter 410 may be omitted. The output inverter 430 is still required to provide a driving capability defined in the standard cell library for the following stage which receives the output signal SOUT.

Figure 5A:
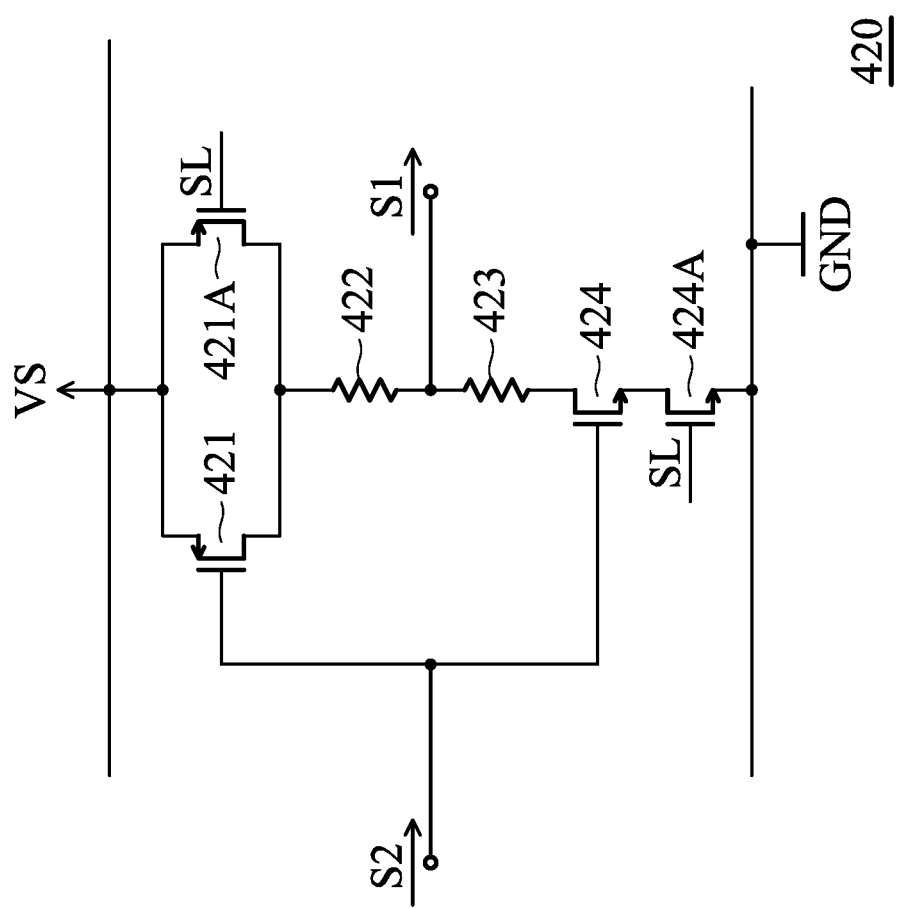
FIGS. 5A-5B show schematic diagrams of the delay element 420 in FIG. 4 in accordance with other embodiments of the invention.
Figure 5B:
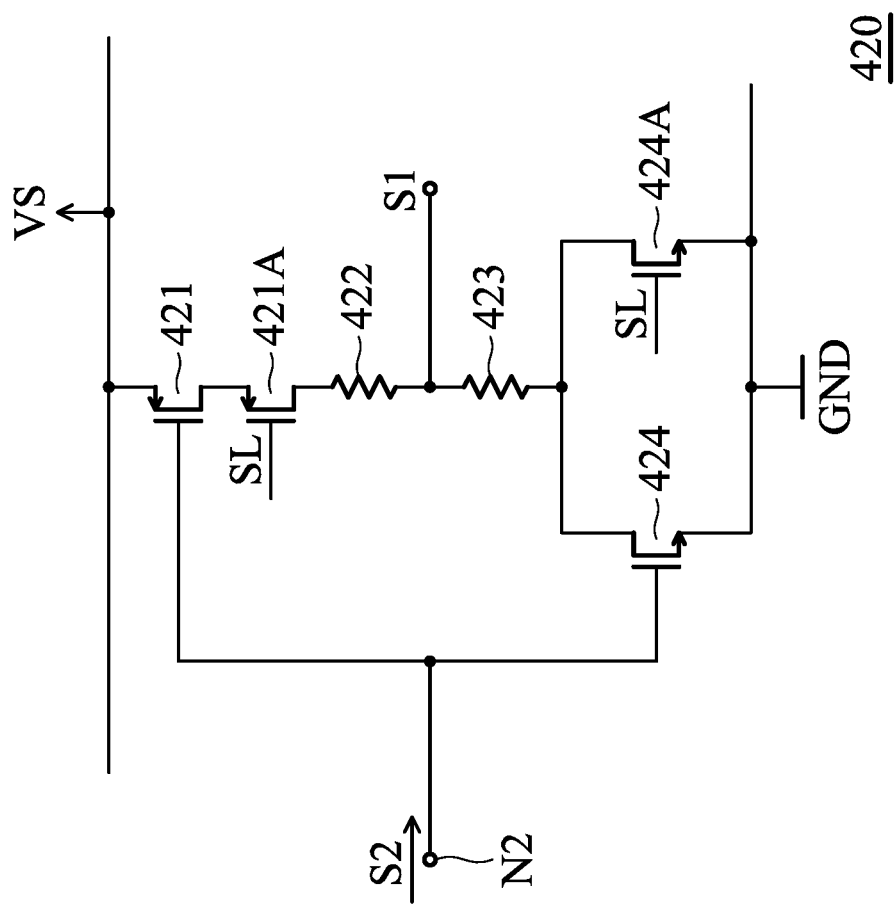

FIGS. 5A-5B show schematic diagrams of the delay element 420 in FIG. 4 in accordance with other embodiments of the invention. As shown in FIGS. 5A-5B, the delay element 420 further includes the second P-type transistor 421A and the second N-type transistor 424A, which are both controlled by the logic signal SL. As shown in FIG. 5A, the second P-type transistor 421A is coupled to the first P-type transistor 421 in parallel, and the second N-type transistor 424A is coupled to the first N-type transistor 424 in series, such that the delay element 420 in FIG. 5A performs a logic function of NAND on the second internal signal S2 and the logic signal SL to generate the first internal signal S1.

As shown in FIG. 5B, the second P-type transistor 421A is coupled to the first P-type transistor 421 in series, and the second N-type transistor 424A is coupled to the first N-type transistor 424 in parallel, such that the delay element 420 in FIG. 5B performs a logic function of NOR on the second internal signal S2 and the logic signal SL to generate the first internal signal S1. According to other embodiments of the invention, the delay element 420 may further includes any number of P-type transistors and N-type transistors to form a digital circuit, such as a combinational digital circuit, a sequential digital circuit, or any other type of digital circuit.

Figure 6:
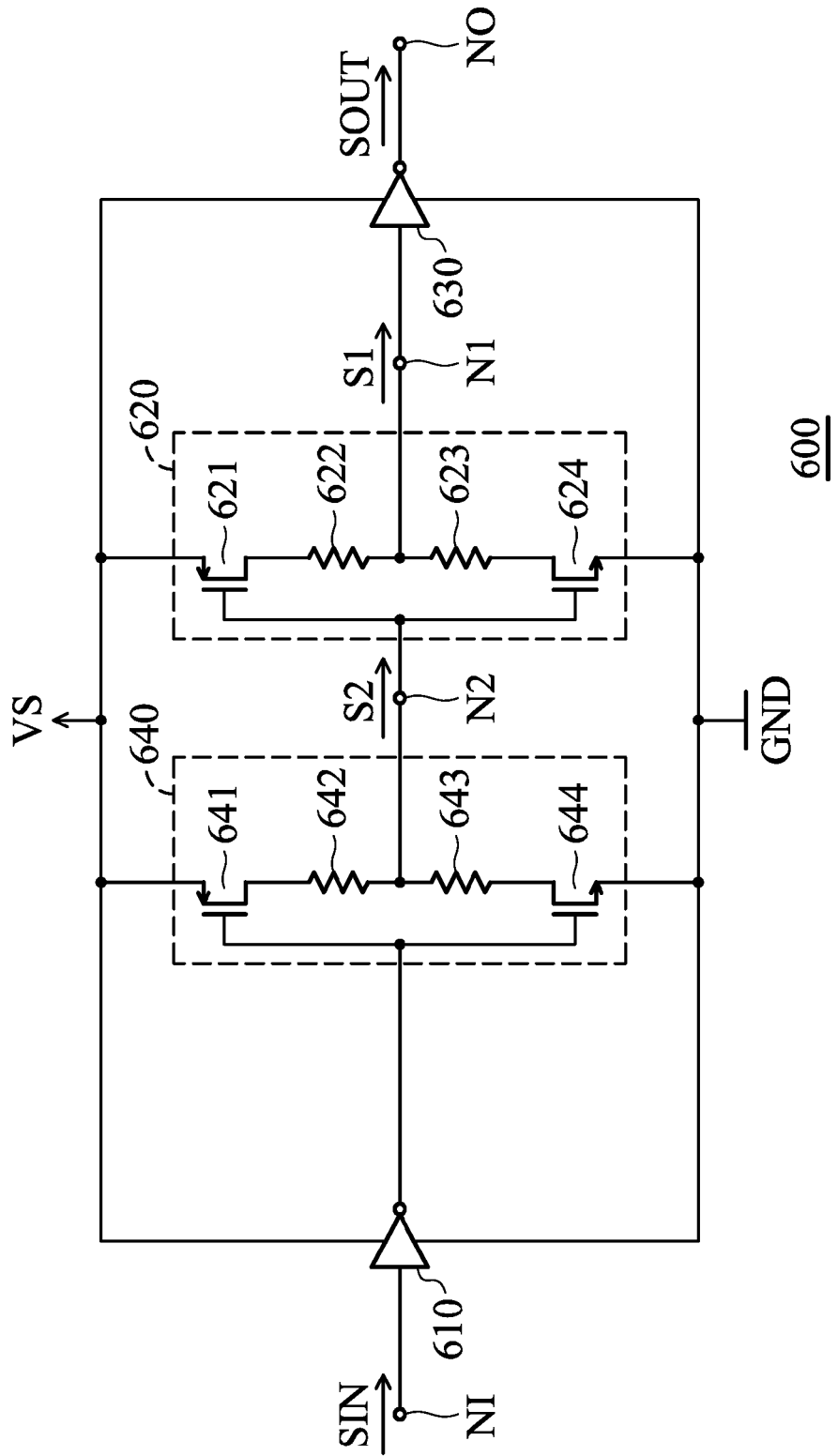
FIG. 6 is a block diagram of a delay cell in accordance with another embodiment of FIG. 4 in the invention.

FIG. 6 is a block diagram of a delay cell in accordance with another embodiment of FIG. 4 in the invention. As shown in FIG. 6, the delay cell 600 includes the input inverter 610, the first delay element 620, the output inverter 630, and the second delay element 640. Compared to FIG. 4, the second delay element 640 is inserted between the input inverter 610 and the first delay element 620.

According to an embodiment of the invention, the delay generated by the delay cell 600 is dominated by the sum of the propagation delay of the first delay element 620 and the propagation delay of the second delay element 640, although the delay generated by the delay cell 600 is equal to the sum of the propagation delays generated by the input inverter 610, the first delay element 620, the output inverter 630, and the second delay element 640.

The first delay element 620 includes the first P-type transistor 621, the first resistor 622, the second resistor 623, and the first N-type transistor 624. The propagation delay generated by the first delay element 620 is determined by the resistance of the first resistor 622 and the second resistor 623 and the total capacitance at the first internal node N1.

According to an embodiment of the invention, the resistance of the first resistor 622 exceeds the turn-on resistance of the first P-type transistor 621, and the resistance of the second resistance 623 exceeds the turn-on resistance of the first N-type transistor 624. According to another embodiment of the invention, the resistance of the first resistor 622 exceeds 10 times the turn-on resistance of the first P-type transistor 621, and the resistance of the second resistor 623 exceeds 10 times the turn-on resistance of the first N-type transistor 624. Therefore, the propagation delay of the first delay element 620 is dominated by the resistance of the first resistor 622 and the second resistor 623 and the total capacitance at the first internal node N1.

The second delay element 640 includes the second P-type transistor 641, the third resistor 642, the fourth resistor 643, and the second N-type transistor 644. The propagation delay generated by the second delay element 640 is determined by the resistance of the third resistor 642 and the fourth resistor 643 and the total capacitance at the second internal node N2. According to an embodiment of the invention, the second P-type transistor 641 and the second N-type transistor 644 are sized to provide a consistent capacitance defined in the standard cell library for a preceding stage which generates the input signal SIN, such that the input inverter 610 may be omitted.

According to an embodiment of the invention, the resistance of the third resistor 642 exceeds the turn-on resistance of the second P-type transistor 641, and the resistance of the fourth resistance 643 exceeds the turn-on resistance of the second N-type transistor 644. According to another embodiment of the invention, the resistance of the third resistor 642 exceeds 10 times the turn-on resistance of the second P-type transistor 641, and the resistance of the fourth resistor 643 exceeds 10 times the turn-on resistance of the second N-type transistor 644. Therefore, the propagation delay of the second delay element 640 is dominated by the resistance of the third resistor 642 and the fourth resistor 643.

Figure 7:
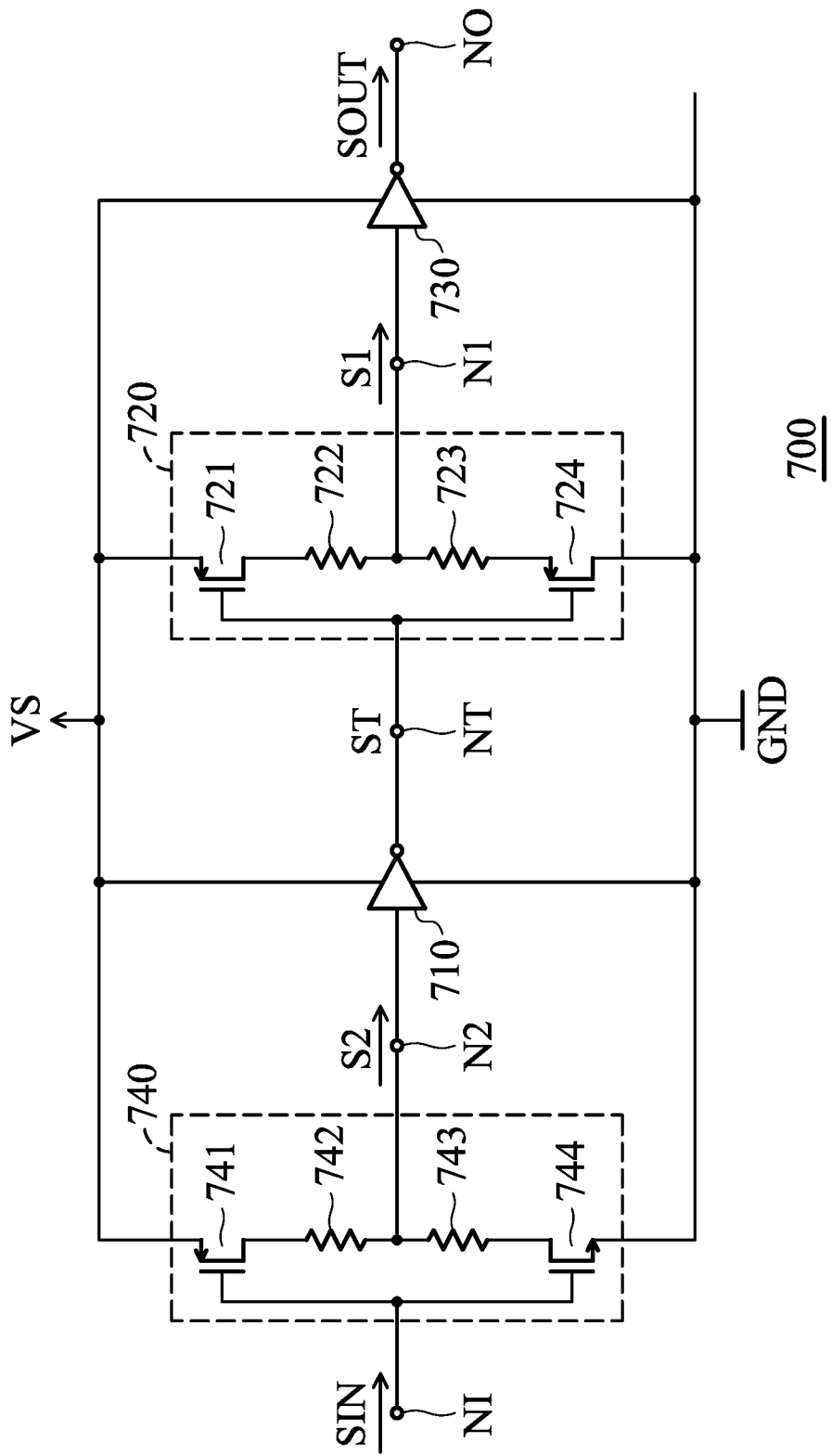
FIG. 7 is a block diagram of a delay cell in accordance with yet another embodiment of FIG. 4 in the invention.

FIG. 7 is a block diagram of a delay cell in accordance with yet another embodiment of FIG. 4 in the invention. As shown in FIG. 7, the delay cell 700 includes the intermediate inverter 710, the first delay element 720, the output inverter 730, and the second delay element 740.

The second delay element 740 includes the second P-type transistor 741, the third resistor 742, the fourth resistor 743, and the second N-type transistor 744. According to an embodiment of the invention, the second P-type transistor 741 and the second N-type transistor 744 are sized to provide a consistent capacitance defined in the standard cell library for a preceding stage which generates the input signal SIN.

The intermediate inverter 710 is coupled between the second delay element 740 and the first delay element 720, which receives the second internal signal S2 at the second internal node N2 to generate the intermediate signal ST at the intermediate node NT. According to an embodiment of the invention, the intermediate inverter 710 is configured to reshape the second internal signal S2 to provide the intermediate signal ST for the first delay element 720, such that the delay cell 700 is able to operate at a high frequency.

Comparing the delay cell 700 with the delay cell 600 in FIG. 6, the input inverter 610 is moved to be placed between the first delay element 720 and the second delay element 740. Since the intermediate signal ST is reshaped by the intermediate inverter 710, the delay generated by the delay cell 700 is less varied due to the process variation. Since the second P-type transistor 741 and the second N-type transistor 744 receive the input signal SIN, the second P-type transistor 741 and the second N-type transistor 744 are sized to provide a consistent capacitance defined in the standard cell library for a preceding stage which generates the input signal SIN.

As stated above, the first delay element 720 includes the first P-type transistor 721, the first resistor 722, the second resistor 723, and the first N-type transistor 724. The resistance of the first resistor 722 and the second resistor 723 are designed to dominantly determine the propagation delay generated by the first delay element 720.

The second delay element 740 includes the second P-type transistor 741, the third resistor 742, the fourth resistor 743, and the second N-type transistor 744. Likewise, the propagation delay generated by the second delay element 740 is designed to be determined by the resistance of the third resistor 742 and the fourth resistor 743 and the total capacitance at the second internal node N2.

According to other embodiments of the invention, the first delay element 720 further includes other P-type transistors serially or parallel coupled to the first P-type transistor 721 and other N-type transistors serially or parallel coupled to the first N-type transistor 724, which are controlled by the first logic signals, to form a digital circuit, such as a combinational digital circuit, a sequential digital circuit, or any other type of digital circuit. The first delay element 720 performs a function of the digital circuit on the first logic signals and the intermediate signal ST to generate the first internal signal S1.

Likewise, the second delay element 740 may include other P-type transistors serially or parallel coupled to the second P-type transistor 741 and N-type transistors serially or parallel coupled to the second N-type transistor 744, which are controlled by the second logic signals, to form a digital circuit, such as a combinational digital circuit, a sequential digital circuit, or any other type of digital circuit. The second delay element 740 performs a function of the digital circuit on the second logic signals and the input signal SIN to generate the second internal signal S2.

Since the resistors are employed, the delay cell 600 in FIG. 6 and the delay cell 700 in FIG. 7 have lower power dissipation and lower leakage power than the delay cell 100 in FIG. 1. According to an embodiment of the invention, the delay cell 600 in FIG. 6 and the delay cell 700 in FIG. 7 provide 70% power dissipation reduction and 45% leakage power reduction under the same variation of the delay generated by the delay cell 600 and the delay cell 700.

In addition, the delay cell 600 in FIG. 6 and the delay cell 700 in FIG. 7 provide better immunity to the process variation and the power supply noise, compared to the delay cell 300 in FIG. 3. According to an embodiment of the invention, the delay cell 600 in FIG. 6 and the delay cell 700 in FIG. 7 provide 15% variation reduction of the delay under the same power dissipation and leakage power, in which the variation of the generated delay is caused by the process variation, supply voltage, and temperature.

Namely, the delay cell 600 in FIG. 6 and the delay cell 700 provide better immunity to the variation caused by the process variation, supply voltage and temperature than the delay cell 300 in FIG. 3. The delay cell 600 in FIG. 6 and the delay cell 700 also provide lower power dissipation and lower leakage power than the delay cell 100 in FIG. 1.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A delay cell for generating a desired delay defined in a standard cell library comprising:
    a first delay element, receiving an input signal at an input node to generate a first internal signal with a first propagation delay relative to the input signal at a first internal node, wherein the first delay element comprises:
    a first P-type transistor, supplied by a supply voltage and controlled by the input signal, wherein the first P-type transistor has a first P-type turn-on resistance;
    a first resistor, coupled between the first P-type transistor and the first internal node, wherein the first resistor has a first resistance;
    a second resistor, coupled to the first internal node, wherein the second resistor has a second resistance, wherein the first propagation delay is dominated according to the first resistance, the second resistance, and a capacitance at the first internal node; and
    a first N-type transistor, coupled between the second resistor and a ground and controlled by the input signal, wherein the first N-type transistor has a first N-type turn-on resistance, wherein the first resistance exceeds 10 times the first P-type turn-on resistance, and the second resistance exceeds 10 times the first N-type turn-on resistance; and
    an output inverter, receiving the first internal signal to generate an output signal with the desired delay relative to the input signal, wherein the output inverter is configured to provide a driving capability defined in the standard cell library for a following stage, wherein the desired delay is dominated by the first propagation delay.

2. The delay cell of claim 1, wherein the first P-type transistor and the first N-type transistor are sized to provide a consistent input capacitance defined in the standard cell library for a preceding stage which generates the input signal.

3. The delay cell of claim 1, wherein the first delay element further comprises:

a second P-type transistor, controlled by a logic signal and coupled to the first P-type transistor in series or in parallel; and a second N-type transistor, controlled by the logic signal and coupled to the first N-type transistor in series or in parallel, wherein the first P-type transistor, the second P-type transistor, the first N-type transistor, and the second N-type transistor construct a logic gate to perform a logic function, such that the first delay element performs the logic function on the logic signal and the input signal to generate the first internal signal with the first propagation delay relative to the logic signal and the input signal.

4. The delay cell of claim 3, wherein the second P-type transistor and the second N-type transistor are sized to provide a consistent input capacitance defined in the standard cell library for a preceding stage which generates the logic signal.

5. The delay cell of claim 1, further comprising:
an input inverter, coupled between the input node and the first delay element and receiving the input signal to provide a second internal signal for the first delay element, wherein the input inverter is configured to provide a consistent input capacitance defined in the standard cell library for a preceding stage which generates the input signal.

6. The delay cell of claim 1, further comprising:
a second delay element, coupled between the input node and the first delay element and receiving the input signal to provide a second internal signal with a second propagation delay relative to the input signal at a second internal node for the first delay element, wherein the second delay element comprises:
a third P-type transistor, supplied by the supply voltage and controlled by the input signal;
a third resistor, coupled between the third P-type transistor and the second internal node;
a fourth resistor, coupled to the second internal node; and
a third N-type transistor, coupled between the fourth resistor and the ground, wherein the desired delay is dominated by a sum of the first propagation delay and the second propagation delay.

7. The delay cell of claim 6, wherein the third resistor has a third resistance and the fourth resistor has a fourth resistance, wherein the second propagation delay is dominated according to the third resistance, the fourth resistance, and a capacitance at the second internal node.

8. The delay cell of claim 7, wherein the third P-type transistor has a third P-type turn-on resistance and the third N-type transistor has a third N-type turn-on resistance, wherein the third resistance exceeds 10 times the third P-type turn-on resistance, and the fourth resistance exceeds 10 times the third N-type turn-on resistance.

9. The delay cell of claim 6, wherein the third P-type transistor and the third N-type transistor are sized to provide a consistent input capacitance defined in the standard cell library for a preceding stage which generates the input signal.

10. The delay cell of claim 6, wherein the second delay element further comprises:
a fourth P-type transistor, controlled by a logic signal and coupled to the third P-type transistor in series or in parallel; and
a fourth N-type transistor, controlled by the logic signal and coupled to the third N-type transistor in series or in parallel, wherein the third P-type transistor, the fourth P-type transistor, the third N-type transistor, and the fourth N-type transistor construct a logic gate to perform a logic function, such that the second delay element performs the logic function on the logic signal and the input signal to generate the second internal signal.

11. The delay cell of claim 6, further comprising:
an input inverter, coupled between the input node and the second delay element and receiving the input signal to provide a third internal signal for the second delay element, wherein the input inverter is configured to provide a consistent input capacitance defined in the standard cell library for a preceding stage.

12. The delay cell of claim 6, further comprising:
an intermediate inverter, coupled between the second delay element and the first delay element and receiving the second internal signal to provide an intermediate signal for the first delay element, wherein the intermediate signal is reshaped, such that the delay cell is able to operate at a high frequency.

13. The delay cell of claim 1, wherein the output signal is delayed by the desired delay behind the input signal.

* * * * *